May 1, 1962     G. B. BOTVIN     3,031,996
REINFORCED BRAZED JOINT AND METHOD AND MEANS
FOR MAKING THE SAME
Filed Feb. 3, 1958

*INVENTOR.*
GEORGE B. BOTVIN
BY
ATTORNEY

United States Patent Office 3,031,996
Patented May 1, 1962

3,031,996
REINFORCED BRAZED JOINT AND METHOD
AND MEANS FOR MAKING THE SAME
George B. Botvin, 189 Charles St., Providence, R.I.
Filed Feb. 3, 1958, Ser. No. 712,829
17 Claims. (Cl. 113—110)

My present invention relates to the metal working art and more particularly to a novel method and means for forming a reinforced brazed joint.

The principal object of the present invention is to provide a novel method of soldering hollow articles.

Another object of the present invention is to provide a novel means for soldering hollow articles to form a reinforced joint.

Another object of the present invention is to provide a novel method of forming a predetermined distribution of the solder and reinforcing material.

A further object of the present invention is to provide a novel means for soldering hollow articles which will effect a considerable saving of labor.

With the above and other objects and advantageous features in view, my invention consists of a novel method of manufacture and a novel means of brazing produced thereby, more fully disclosed in the detailed description following, in conjunction with the accompanying drawings, and more particularly defined in the appended claims.

Figure 1:
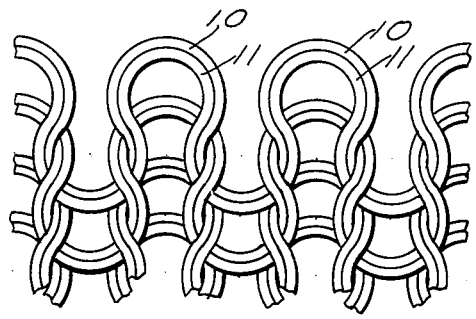
FIG. 1 is an enlarged fragmentary view of a portion of material used in the present invention.

In many constructions it becomes necessary to attach the end of a hollow article such as a tubular rod or a hollow vane to a flat surface. If ordinary solder is used, the articles are joined only along the thin edge of the hollow material. Such a joint is weak and will not stand strain especially a strain at right angles to the joint. It therefore becomes desirable to fill the end of the hollow article with a solid material to form a brazed joint. The junction is then made across the entire area of the end of the hollow article and becomes a solid reinforced joint. However, difficulty has been encountered in filling the end of the hollow article with the correct mixture or ratio of solder to the reinforcing material to provide an even distribution and a perfect joint.

The present invention is designed to provide a novel method and means for ensuring a correct predetermined ratio of the materials used. The present method also provides a simple and easy means of forming the joint.

In practicing the present method, the first step is the determination of the ratio desired between the solder and the reinforcing material. This ratio is then translated into strands of wire having a predetermined diameter for the desired ratio. For example, assuming that the materials to be used are stainless steel and silver solder and assuming that it is desired that the ratio be 70% solder to 30% stainless steel by weight. It will then be found that a stainless steel wire type 430, .005" in diameter and silver solder type AMS 4770, .007" in diameter, when placed side by side will result in a ratio of 70% solder by weight. The two wires are then handled as one and in step 2 are fed into a conventional wire knitting machine to produce a wire mesh fabric in a fairly tight knit. Since both wires are knit simultaneously every inch of this fabric will have the desired ratio.

In step 3 of the process, the fabric is cut to lengths of approximately 12" and in step 4 it is degreased.

The next step depends on the hollow article. A compression mold is provided of the size and shape of the cross section of the hollow article. The knitted material is compressed in this mold under a 30 to 40 ton pressure to form a solid slug which is now shaped to fit into the end of the hollow article. The width or thickness of the slug may be varied to suit different requirements.

The last step of the assembly provides for inserting the slug in the end of the hollow article with flux, placing it against the surface to which it is to be joined and applying sufficient heat to melt the solder in the slug and solidify it with the companion wire. The resultant brazed joint will be found to be uniformly strong and evenly connected. No loose pockets are possible since the solder and steel, in the example given, must be evenly distributed throughout the joint in view of their method of manufacture and assembly.

The above example is given by way of illustration only. The process contemplates the use of a soft metal as the solder and a hard base metal. The criterion is the comparative melting points. The soft metal, used as the solder, must have a lower melting point than the hard metal. The two metals must also be compatible in that the hard metal must bond to the solder or soft metal.

As an example of some of the solder or soft metals, besides silver solder, lead, aluminum, or similar metals can be used. The hard metals may include steel, copper, etc. The particular ratios used depend on the final hardness desired. Good bonding results are obtainable when the solder or soft metal content varies from 10% to 90% by weight. The final hardness will depend on the percentage of solder or soft metal.

One of the main purposes of the present invention is providing a uniform, evenly distributed, predetermined ratio of solder to metal. In the example hereinabove given, the wires are knitted together to obtain this result. However, other comparable methods may be used. For example, the two wires may be braided on a braiding machine, woven on a loom (see FIG. 5) or even wound, bunched or twisted together.

The drawings illustrate the above process. Referring to the drawings, FIG. 1 illustrates the result of knitting a stainless steel wire 10 and a silver solder wire 11 to form conventional knitted loops. The desired ratio of solder to metal exists in every portion of the knitted fabric.

Figure 2:
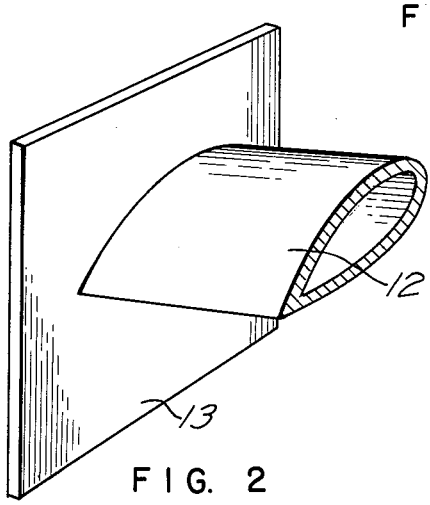
FIG. 2 is a perspective view of a hollow vane joined to a flat surface by the method of the present invention.
Figure 4:
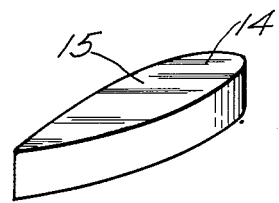
FIG. 4 is a perspective view of the slug for forming the brazed joint.

Now referring to FIG. 2, it is assumed that a hollow vane 12 is to be joined to a flat plate 13. The material shown in FIG. 1 is then compressed to form the slug 14 shown in FIG. 4. The slug 14 has a cross section 15 substantially equal to the inside of the vane 12.

Figure 3:
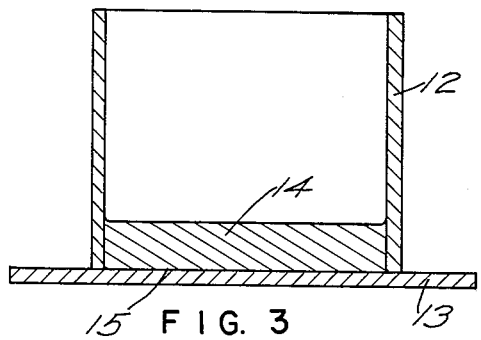
FIG. 3 is a section taken on line 3—3 on FIG. 2.

Referring to FIG. 3, it will be seen that after the slug 14 has been inserted and heat applied, a solid reinforced brazed joint is provided. The even distribution of solder and metal ensures complete contact between the surface 15 of the slug and the surface of the plate 13. The thickness of the slug fills the hollow vane 12 at the joint to relieve the twisting strain on the joint by any pressures at right angles to the vane.

Figure 5:
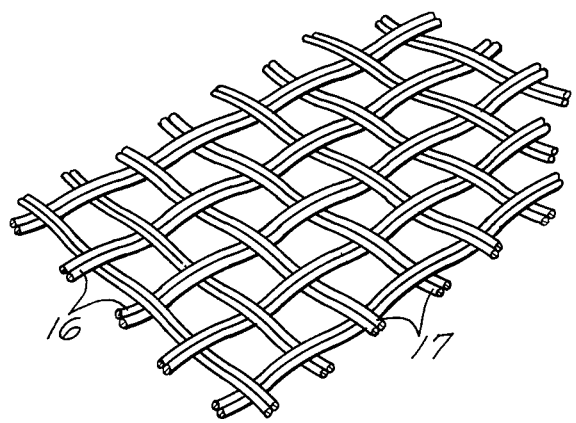
FIG. 5 is an enlarged fragmentary view of a portion of alternative material to be used in the present invention.

As stated herein, the wires for forming the slug may be woven, as shown in FIG. 5. The soft and hard wires may be set up in a loom to form a double stranded warp 16 and woven with a similar double stranded weft 17. A slug formed from this material will also have the necessary even distribution and correct ratio of metals. In this form, single strands can also be used, with the soft metal running in one direction and the hard metal in the other direction.

The method is simple and easy to practice and the resultant brazed joint ensures strength and rigidity. The use of the slug 14 saves time and labor in forming the joint. Other advantages of the present invention will be readily apparent to a person skilled in the art.

I claim:

1. The method of forming a brazing slug having an evenly interspersed composition of a hard metal and a soft brazing metal with a lower melting point than the hard metal and capable of bonding with the hard metal, comprising the steps of knitting a soft brazing metal wire and a hard metal wire into a mesh fabric having an evenly distributed composition of soft and hard wires, cutting a length of said fabric, and compressing said length into a substantially solid slug.

2. The method of forming a brazing slug having an evenly interspersed composition of a hard metal and a soft brazing metal with a lower melting point than the hard metal and capable of bonding with the hard metal, comprising the steps of weaving a soft brazing metal wire and a hard metal wire into a mesh fabric having an evenly distributed composition of soft and hard wires, cutting a length of said fabric, and compressing said length into a substantially solid slug.

3. The method of forming a brazing slug having an evenly interspersed composition of a hard metal and a soft brazing metal with a lower melting point than the hard metal and capable of bonding with the hard metal, comprising the steps of braiding a soft brazing metal wire and a hard metal wire into a mesh fabric having an evenly distributed composition of soft and hard wires, cutting a length of said fabric, and compressing said length into a substantially solid slug.

4. The method of forming a brazing slug having an evenly interspersed composition of a hard metal and a soft brazing metal with a lower melting point than the hard metal and capable of bonding with the hard metal, comprising the steps of passing a soft brazing metal wire and a hard metal wire simultaneously in contiguous relation through a knitting machine to form a double wire fabric having an evenly distributed composition of soft and hard wires, cutting a length of said fabric, and compressing said length into a substantially solid slug.

5. The method of forming a brazing slug having an evenly interspersed composition of a hard metal and a soft brazing metal with a lower melting point than the hard metal and capable of bonding with the hard metal, comprising the steps of passing a soft brazing metal wire and a hard metal wire simultaneously in contiguous relation through a braiding machine to form a double wire fabric having an evenly distributed composition of soft and hard wires, cutting a length of said fabric, and compressing said length into a substantially solid slug.

6. The method of forming a brazing slug having an evenly interspersed composition of a hard metal and a soft brazing metal with a lower melting point than the hard metal and capable of bonding with the hard metal, comprising the steps of passing a soft brazing metal wire and a hard metal wire simultaneously in contiguous relation through a loom to form a double wire fabric having an evenly distributed composition of soft and hard wires, cutting a length of said fabric, and compressing said length into a substantially solid slug.

7. The method of forming a brazing slug having an evenly interspersed composition of hard metal and a soft brazing metal with a lower melting point than the hard metal and capable of bonding with the hard metal, comprising the steps of forming a soft brazing metal wire and a hard metal wire of predetermined diameters into a mesh fabric having an evenly distributed predetermined composition of soft and hard wires, cutting a length of said fabric, and compressing said length into a substantially solid slug having a predetermined ratio of soft metal to hard metal.

8. The method of forming a brazing slug having an evenly interspersed composition of a hard metal and a soft brazing metal with a lower melting point than the hard metal and capable of bonding with the hard metal, comprising the steps of forming a soft brazing metal wire and a hard metal wire into a mesh fabric having an evenly distributed composition of soft and hard wires, cutting a length of said fabric, and compressing said length into a substantially solid slug of a size and shape to fit into one of the articles being brazed.

9. The method of forming a brazing slug having an evenly interspersed composition of hard metal and a soft brazing metal with a lower melting point than the hard metal and capable of bonding with the hard metal, comprising the steps of forming a soft brazing metal wire and a hard metal wire of predetermined diameters into a mesh fabric having an evenly distributed predetermined composition of soft and hard wires, cutting a length of said fabric, and compressing said length into a substantially solid slug having a predetermined ratio of soft metal to hard metal of a size and shape to fit into one of the articles being brazed.

10. The method of forming a brazing slug having an evenly interspersed composition of hard metal and a soft brazing metal with a lower melting point than the hard metal and capable of bonding with the hard metal, comprising the steps of forming a soft brazing metal wire and a hard metal wire of predetermined diameters into a mesh fabric having an evenly distributed predetermined composition of soft and hard wires, cutting a length of said fabric, and compressing said length into a substantially solid slug having a predetermined ratio of soft metal to hard metal between 10% and 90% soft metal to between 90% and 10% hard metal by weight.

11. The method of forming a brazing slug, comprising the steps of forming a silver solder wire and a stainless steel wire into a mesh fabric having an evenly distributed composition of silver solder and stainless steel wires, cutting a length of said fabric, and compressing said length into a substantially solid slug having an evenly interspersed composition of silver and stainless steel.

12. The method of forming a brazing slug, comprising the steps of passing a silver solder wire and a stainless steel wire simultaneously in contiguous relation through a knitting machine to form a knitted double wire fabric, cutting a length of said fabric, and compressing said length into a substantially solid slug having an evenly interspersed composition of silver solder and stainless steel.

13. The method of forming a brazing slug, comprising the steps of passing a silver solder wire approximately .007" in diameter and a stainless steel wire approximately .005" in diameter simultaneously in contiguous relation through a knitting machine to form a knitted double wire fabric, cutting a length of said fabric approximately 12" long, and compressing said length into a substantially solid slug having an evenly interspersed composition of approximately 70% silver solder to approximately 30% stainless steel by weight.

14. The method of forming a brazing slug, comprising the steps of passing a silver solder wire approximately .007" in diameter and a stainless steel wire approximately .005" in diameter simultaneously in contiguous relation through a knitting machine to form a knitted double wire fabric, cutting a length of said fabric approximately 12" long, and compressing said length into a substantially solid slug having an evenly interspersed composition of approximately 70% silver solder to approximately 30% stainless steel by weight of the shape and size of the interior section of the article to be brazed.

15. A brazing slug for forming a reinforced joint comprising a substantially solid slug formed of a compressed mesh fabric having an evenly interspersed composition of soft brazing metal and hard metal wherein said soft brazing metal has a lower melting point than said hard metal and said metals are capable of bonding to each other.

16. A brazing slug for forming a reinforced joint comprising a substantially solid slug formed of a compressed mesh fabric having an evenly interspersed predetermined composition of soft brazing metal and hard metal wherein said soft brazing metal has a lower melting point than said hard metal and said metals are capable of bonding to each other.

17. A brazing slug for forming a reinforced joint comprising a substantially solid slug formed of a compressed mesh fabric having an evenly interspersed predetermined composition of soft brazing metal and hard metal wherein said soft brazing metal has a lower melting point than said hard metal and said metals are capable of bonding to each other and shaped to fit the article being brazed.

References Cited in the file of this patent

UNITED STATES PATENTS

| | | |
|---|---|---|
| 1,291,878 | Hess | Jan. 21, 1919 |
| 2,234,127 | Mautsch | Mar. 4, 1941 |
| 2,297,554 | Hardy et al. | Sept. 29, 1942 |
| 2,431,611 | Durst | Nov. 25, 1947 |
| 2,503,564 | Reeve | Apr. 1, 1950 |
| 2,644,352 | Ressegger | July 7, 1953 |
| 2,741,932 | Whitney et al. | Apr. 17, 1956 |
| 2,755,545 | Moore | July 24, 1956 |